R. L. & J. M. BROWN.
HYDRAULIC AMALGAMATOR.
APPLICATION FILED JUNE 17, 1912.
1,059,524. Patented Apr. 22, 1913.
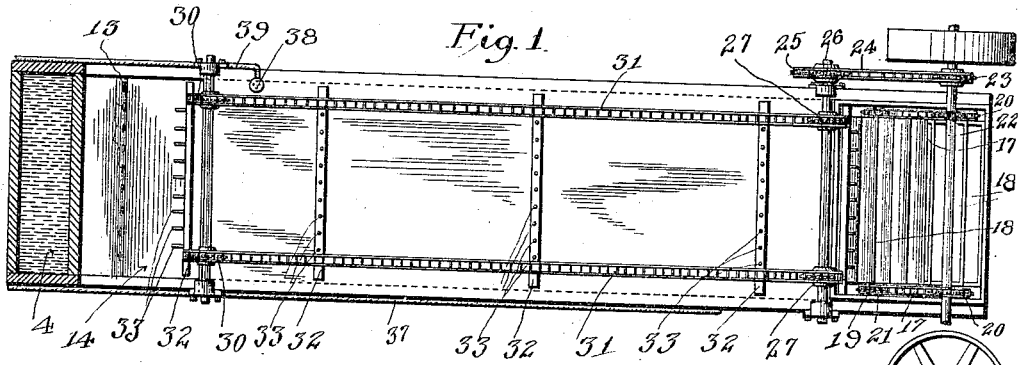
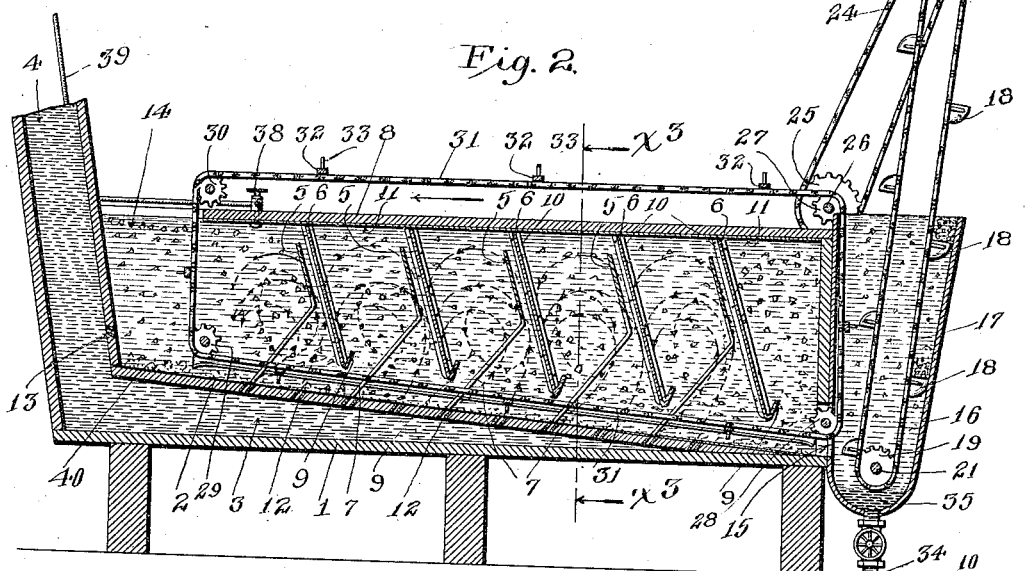
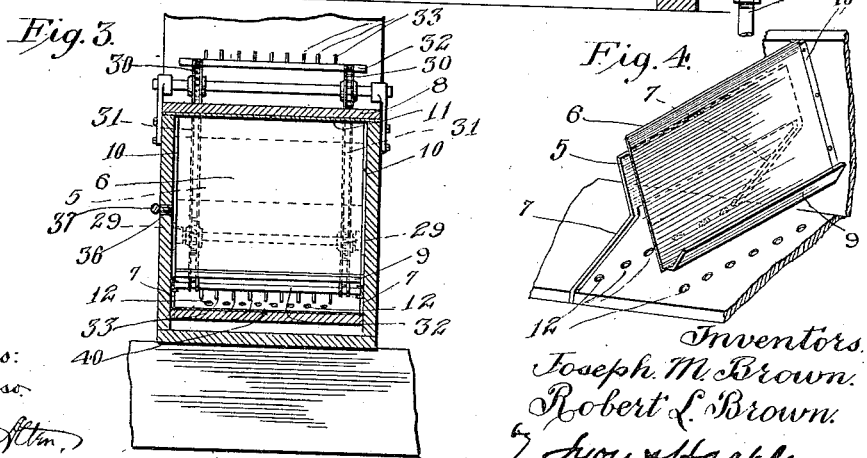
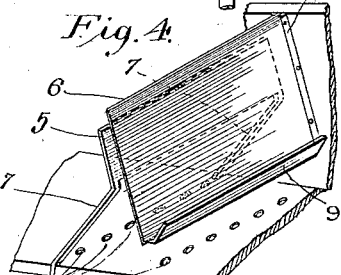
Witnesses:
Inventors:
Joseph M. Brown.
Robert L. Brown.

UNITED STATES PATENT OFFICE.

ROBERT L. BROWN AND JOSEPH M. BROWN, OF LOS ANGELES, CALIFORNIA.

HYDRAULIC AMALGAMATOR.

1,059,524.     Specification of Letters Patent.     Patented Apr. 22, 1913.

Application filed June 17, 1912. Serial No. 704,236.

*To all whom it may concern:*

Be it known that we, ROBERT L. BROWN and JOSEPH M. BROWN, citizens of the United States, residing at Los Angeles, in the county of Los Angeles and State of California, have invented a Hydraulic Amalgamator, of which the following is a specification.

The principal object of this invention is to save fine float gold, and we attain this object by the construction herein shown and described.

Referring to the drawings:—Figure 1 is a plan view. Fig. 2 is a vertical longitudinal section through the machine. Fig. 3 is a cross section on line $x^3$—$x^3$ Fig. 2. Fig. 4 is a perspective of a pair of amalgamating plates and adjacent portions of the apparatus.

1 designates the bottom of the apparatus above which is an inclined partition 2 forming a water space 3, and at one end of the apparatus is a water inlet 4. Above the inclined partition 2 is an amalgamating chamber in which are arranged a series of pairs of amalgamating plates 5 and 6. The plates 5 are narrower than the plates 6 and are supported by inclined bars 7 which project up from the partition 2. The plates 6 are coated with amalgam. Each plate 6 is arranged parallel with and close to the associated plate 5 and each plate 6 extends below an upper wall 8. The lower edge of each plate 6 has a ledge 9. The end edges of each plate 6 lie between inclined strips 10 which are secured to the side walls of the amalgamating chamber. The lower ends of the plates 10 are arranged at a uniform distance above the inclined partition 2 but the lower edges of the plates 5 are on the same horizontal line. Secured to the under side of the upper wall 8 is a plate 11 the surface of which is coated with amalgam.

The inclined partition 2 is provided with a series of inclined water discharge orifices 12 in line with the lower end of each pair of supporting bars 7, as clearly shown in Fig. 4, and is also provided with intermediate rows of orifices 12, as indicated in Figs. 2 and 4. The side wall of the water inlet 4 also has a row of water discharge orifices 13.

The upper wall 8 is provided with an opening 14 through which the material in either a dry or wet condition is introduced, and at the lower end of the inclined partition 2 is a discharge orifice 15 which communicates with a chamber 16 within which is an elevator consisting of a pair of endless chains 17 carrying buckets 18. The chains 17 run over sprockets 19 and 20 arranged on shafts 21 and 22 respectively. The shaft 22 also carries a sprocket 23 which is connected by a chain 24 with a sprocket 25 on the shaft 26, and mounted on the shaft 26 are sprockets 27. In the discharge opening 15 is another pair of sprockets 28 and near the head end of the machine near the inclined bottom 2 is a pair of sprockets 29, while above the upper wall 8 is a pair of sprockets 30. A pair of chains 31 run over the sprockets 27, 28, 29 and 30 and cross bars 32 are carried by the chains 31. Each cross bar 32 is provided with a series of pins 33, thus forming an agitator which is caused to travel in the direction of the arrow, Fig. 2, being driven by chain 24. In the lower end of the chamber 16 is a drain pipe 34. We place a small quantity of mercury 35 in the bottom of the chamber 16.

Each pair of plates 5 and 6 form the terminals of an electrolytic circuit, the plates 5 being connected by insulated wires 36 which extend through the side wall of the amalgamating chamber and are connected to a conductor 37 on the outside of the amalgamating chamber. The plates 6 are in electrical connection with plate 11 and the latter is in connection with a terminal 38 from which a conductor 39 extends.

In operation water is admitted through the water inlet 4 into the space below the partition 2 and is under sufficient head to cause it to project streams of much force through the inclined water discharge orifices 12 into the amalgamating chamber. Each stream of water enters in a general direction toward a plate 6 and the amalgamating chamber becomes filled with water, the water entirely filling the chamber so as to be in contact with the top plate 11. The material containing the gold is introduced through the opening 14 and passes down, being assisted in the movement toward the lower end of the amalgamating chamber by the streams of water which enter through the water discharge openings 13. The material encounters eddy currents which are formed by the incoming streams from orifices 12. Each of these eddy currents has substantially the general direction of movement shown by dotted lines and arrows in Fig. 2, and it should be noted that the water above and which is in contact with the plate 11 is still. The particles of float gold which encounter the eddy currents are caused to be ducked and becoming submerged either fall against the plates 6 and slide down onto the ledges 9 or if they escape the ledges 9, fall onto a carpet 40 which is on the inclined partition 2 and are caught. Those particles of gold which float on the surface of the water and rest on the still water against the plate 11 adhere to that plate or if they lie between plates 5 and 6 are carried against the plate 6 by the electric current which is constantly passing from plates 5 to plates 6, and thus all particles of gold are caught. The agitator, consisting of the series of pins 33, constantly travels through the mass of solids in the amalgamating chamber which are thus prevented from becoming packed. Material with the gold thus removed having reached the lower end of the amalgamating chamber passes into the chamber 16 and is raised by the elevator and discharged. The overflow of water from the chamber 16 occurs at the upper edge thereof. The mercury 35 is placed in the lower part of the chamber 16 as a precaution to catch any fine gold which might possibly work into the chamber 16.

What we claim is:—

1. A water chamber, an amalgamating chamber above the water chamber, an inclined partition between said chambers, a series of amalgamating plates in the amalgamating chamber, the partition being located above the water chamber and below the amalgamating chamber, said partition being formed with a plurality of pairs of rows of water discharge orifices, each pair of rows of orifices directing two sets of streams of water toward a single amalgamating plate.

2. A water chamber, an amalgamating chamber above the same, an inclined partition between said chambers, said partition having a plurality of series of water discharge orifices, a series of amalgamating plates in said amalgamating chamber, and a flat amalgamating plate forming the upper wall of the amalgamating chamber.

3. A water chamber, an amalgamating chamber above the water chamber, a horizontal amalgamating plate forming the upper wall of the amalgamating chamber, a series of amalgamating plates extending down from said horizontal plate, a series of plates adjacent the amalgamating plates, means for producing an electric current between said associated plates, and means introducing streams of water from the water chamber into the amalgamating chamber in a direction toward said plates.

4. An amalgamating chamber, an amalgamating plate forming the upper wall thereof, plates extending below said upper plate, and means for producing eddy currents in the solution in the amalgamating chamber between the respective plates at a point below the upper plate without disturbing the solution in contact with the upper plate.

5. An amalgamating chamber, an amalgamating plate forming the upper wall thereof and in contact with the solution therein, a series of amalgamating plates extending downward from the upper plate and forming amalgamating compartments, a series of plates adjacent the respective amalgamating plates, means for producing eddy currents in the solution in the lower part of each of said compartments without disturbing the solution in contact with the upper amalgamating plate.

6. An amalgamating chamber, an amalgamating plate forming the upper wall thereof and in contact with the solution therein, a series of amalgamating plates extending downward from the upper plate and forming amalgamating compartments, a series of plates adjacent the respective amalgamating plates, means for producing eddy currents in the solution in the lower part of each of said compartments without disturbing the solution in contact with the upper amalgamating plate, and means traveling along the amalgamating chamber below said amalgamating plates for stirring the solids in the solution.

7. An amalgamating chamber, an amalgamating plate forming the upper wall thereof and in contact with the solution therein, a series of amalgamating plates extending downward from the upper plate and forming amalgamating compartments, a series of plates adjacent the respective amalgamating plates, means for producing eddy currents in the solution in the lower part of each of said compartments without disturbing the solution in contact with the upper amalgamating plate, a pair of chains, means for supporting the lower rungs of said chains in the lower part of the amalgamating chamber, means for driving said chains, cross bars between the chains and pins projecting from the cross bars.

8. An amalgamating chamber, a water chamber below the same, a series of amalgamating plates in the amalgamating chamber, a horizontal amalgamating plate forming the upper wall of the chamber, an elevating chamber at the tail end of the amalgamating chamber, said elevating chamber having an overflow at a point at least as high as the upper horizontal amalgamating plate, an elevator in the elevating chamber for lifting solids, and means for introducing streams of water from the water chamber into the amalgamating chamber to form eddy currents in the lower part thereof without disturbing the solution which lies against the horizontal amalgamating plate.

9. An amalgamating chamber, a water chamber below the same, a horizontal amalgamating plate forming the upper wall of the amalgamating chamber, a series of inclined amalgamating plates extending down from the horizontal plate, ledges on the lower ends of the inclined plates, another series of inclined plates adjacent the first plates, and means for introducing water in streams from the water chamber into the amalgamating chamber.

10. An amalgamating chamber having an inclined bottom, a water chamber below the amalgamating chamber, a horizontal amalgamating plate forming the upper wall of the amalgamating chamber, a series of amalgamating plates below the horizontal plate, the water chamber having a vertical water inlet, the wall of the inlet provided with a series of water discharge orifices for directing streams of water into the amalgamating chamber in a direction substantially parallel with the bottom thereof.

11. An amalgamating chamber, a horizontal amalgamating plate forming the upper wall thereof, means for introducing water into the amalgamating chamber, a series of amalgamating plates in said chamber dividing same into a series of compartments, means for maintaining the level of solution in said compartments in contact with the upper horizontal amalgamating plate, and means for producing a commotion in the solution in the lower part of the compartments to duck the float gold without disturbing the solution or float gold which is in contact with the horizontal amalgamating plate in the upper part of each compartment.

In testimony whereof, we have hereunto set our hands at Los Angeles, California, this 12th day of June, 1912.

ROBERT L. BROWN.
JOSEPH M. BROWN.

In presence of—
  GEO. T. HACKLEY,
  MARTHA M. LANGE.

---

Copies of this patent may be obtained for five cents each, by addressing the "Commissioner of Patents, Washington, D. C."